United States Patent
Yanata

(10) Patent No.: US 9,052,659 B2
(45) Date of Patent: Jun. 9, 2015

(54) REFLECTIVE OPTICAL SENSOR AND IMAGE FORMING DEVICE INCORPORATING THE SAME

(71) Applicant: Toshio Yanata, Kanagawa (JP)

(72) Inventor: Toshio Yanata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 57 days.

(21) Appl. No.: 13/726,716

(22) Filed: Dec. 26, 2012

(65) Prior Publication Data

US 2013/0164007 A1 Jun. 27, 2013

(30) Foreign Application Priority Data

Dec. 27, 2011 (JP) .................................. 2011-285336

(51) Int. Cl.
- *G03G 15/00* (2006.01)
- *G01J 1/42* (2006.01)
- *G01J 1/02* (2006.01)

(52) U.S. Cl.
CPC . *G03G 15/50* (2013.01); *G01J 1/42* (2013.01); *G01J 1/0271* (2013.01); *G01J 1/0214* (2013.01); *G03G 15/5058* (2013.01)

(58) Field of Classification Search
CPC .......... G03G 15/5033; G03G 15/5041; G03G 15/5062
USPC ............................ 399/49, 74, 301, 303, 298
See application file for complete search history.

(56) References Cited

U.S. PATENT DOCUMENTS

| | | | |
|---|---|---|---|
| 2002/0164181 A1* | 11/2002 | Parker et al. | 399/298 |
| 2008/0075492 A1* | 3/2008 | Mestha et al. | 399/49 |
| 2011/0222892 A1 | 9/2011 | Hashiguchi et al. | |
| 2012/0298845 A1 | 11/2012 | Sato et al. | |

FOREIGN PATENT DOCUMENTS

| | | |
|---|---|---|
| JP | 2007-13050 | 1/2007 |
| JP | 2009-38320 | 2/2009 |
| JP | 2009-58520 | 3/2009 |

OTHER PUBLICATIONS

U.S. Appl. No. 13/539,774, filed Jul. 2, 2012, Sohichiroh Naka et al.
U.S. Appl. No. 13/534,369, filed Jun. 27, 2012, Norifumi Yamamoto et al.
U.S. Appl. No. 13/533,640, filed Jun. 26, 2012, Masafumi Hashiguchi et al.

* cited by examiner

*Primary Examiner* — Walter L Lindsay, Jr.
*Assistant Examiner* — Jessica L Eley
(74) *Attorney, Agent, or Firm* — Cooper & Dunham LLP

(57) ABSTRACT

A reflective optical sensor includes a light emitting element to irradiate a target object with a light beam, a light receiving element to receive the light beam reflected by the surface of the target object, a circuit board on which the light emitting element and light receiving element are mounted, a cover element supported on the circuit board to surround the light emitting element and light receiving element, and a light shielding wall provided in the cover element to be a partition between the light emitting element and light receiving element to prevent a part of the light beam from the light emitting element from leaking to the light receiving element. A layer in a certain thickness is formed on the surface of the circuit board along either or both sides of the light shielding wall.

6 Claims, 5 Drawing Sheets

REFLECTIVE OPTICAL SENSOR AND IMAGE FORMING DEVICE INCORPORATING THE SAME

CROSS REFERENCE TO RELATED APPLICATION

The present application is based on and claims priority from Japanese Patent Application No. 2011-285336, filed on Dec. 27, 2011, the disclosure of which is hereby incorporated by reference in its entirety.

BACKGROUND OF THE INVENTION

1. Field of the Invention

The present invention relates to a reflective optical sensor having a light emitting element to irradiate a target object with a light beam and a light receiving element to receive the light beam reflected by the target object and to an image forming device such as a copier, printer, or facsimile machine incorporating such an optical sensor.

2. Description of the Related Art

In an electrophotographic image forming device such as a copier, printer, or facsimile machine, toner images are generally formed from electrostatic latent images on photoreceptor drums by attaching toner to the electrostatic latent images, and transferred and fused on a paper material for outputs.

To obtain good toner images with proper toner density, the device includes an optical sensor to irradiate a toner patch on a photoreceptor drum or an intermediate transfer belt and calculate the density of the toner patch from the amount of light reflected by the toner patch. The device adjusts the image density to a proper value based on the calculated density by controlling a charge bias or a develop bias, for example.

Japanese Patent Application Publication No. 2007-13050 discloses a typical reflective optical sensor or photosensor which includes a light emitting element to irradiate the toner patch as a target object with a light beam and a light receiving element to receive the light beam reflected by the toner patch.

There may be a case that a part of the light beam from the light emitting element is reflected by the surface of a circuit board and enters the light receiving element. This reflective optical sensor includes a light shielding wall between the light emitting element and light receiving element, to prevent the reflected light beam from leaking as ambient light to the light receiving element. The incidence of ambient light on the light receiving element causes a decrease in the accuracy of detection of a toner density.

In this reflective optical sensor, a groove is formed on the circuit board surface between the light emitting and receiving elements, into which the light shielding wall is fitted, for the purpose of preventing the reflected light beam from leaking through a gap between the bottom surface of the light shielding wall and the circuit board. To fit the light shielding wall into the groove without a play, the circuit board needs to be cut by a router to form the shape of the groove precisely. This increases the production time and costs for prevention of light leakage.

SUMMARY OF THE INVENTION

The present invention aims to provide a reflective optical sensor and an image forming device incorporating the same which can reduce the production time and costs for preventing the leakage of light.

According to one aspect of the present invention, a reflective optical sensor includes a light emitting element to irradiate a target object with a light beam, a light receiving element to receive the light beam reflected by a surface of the target object, a circuit board on which the light emitting element and light receiving element are mounted, a cover element supported on the circuit board to surround the light emitting element and light receiving element, and a light shielding wall provided in the cover element to be a partition between the light emitting element and light receiving element, and positioned to contact a surface of the circuit board at one end or not to contact the surface at one end with a minute gap, to prevent a part of the light beam from the light emitting element from leaking to the light receiving element, the one end being an end close to the circuit board, wherein a layer in a certain thickness is formed on the surface of the circuit board along either or both sides of the light shielding wall.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

First Embodiment

Figure 1:
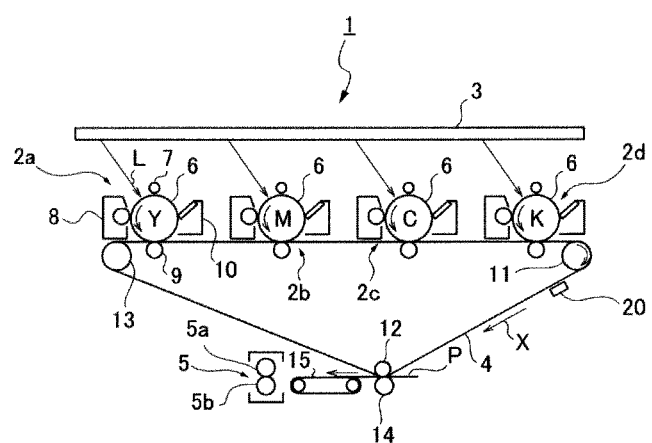
FIG. 1 schematically shows the structure of the essential part of an image forming device according to a first embodiment of the present invention.

FIG. 1 schematically shows the structure of the essential part of an image forming device 1 according to a first embodiment. A reflective optical sensor according to the present embodiment is used for a density sensor to detect the density of a toner patch as a target object formed on an intermediate transfer belt as an image carrier. The image forming device according to the present embodiment is of a tandem type such as an electrophotographic color copier or color printer.

In FIG. 1 the image forming device 1 comprises four imaging units 2a, 2b, 2c, 2d, an exposure unit 3, an intermediate transfer belt 4, and a fuser unit 5.

The imaging units 2a, 2b, 2c, 2d include photoreceptor drums 6, and charge rollers 7, develop units 8, primary transfer rollers 9, and cleaning elements 10 around the photoreceptor drums 6, respectively. In the drawing the numeric codes for the elements of the imaging units 2b, 2c, 2d are omitted except for the photoreceptor drums 6. The develop units 8 contain toner of yellow (Y), magenta (M), cyan (C), and black (K), respectively.

The no-end intermediate transfer belt 4 is extended over a drive roller 11, an opposite secondary transfer roller 12, and a driven roller 13 to move by the rotation of the drive roller 11 in the direction indicated by the arrow X. The primary transfer rollers 9 contact the photoreceptor drums 6 and the opposite roller 12 contacts the secondary transfer roller 14, both placing the intermediate transfer belt 4 between them. The fuser unit 5 includes a fuse roller 5a and a pressure roller 5b.

A reflective optical sensor 20 is disposed near the intermediate transfer belt 4 to face it and detect the density of toner patches 30 (FIG. 2) on the surface of the intermediate transfer belt 4.

To form images with the image forming device 1, the surfaces of the photoreceptor drums 6 of the imaging units 2a, 2b, 2c, 2d are uniformly charged with the charge rollers 7 while rotated at a certain speed. Then, they are exposed with a laser beam L from the exposure unit 3, to form electrostatic latent images thereon in accordance with input image information.

The four color toners are adhered onto the electrostatic latent images on the photoreceptor drums 6 by the develop units 8, respectively, and developed or visualized. Thus, the yellow, magenta, cyan, and black toner images are formed on the photoreceptor drums 6.

By the primary transfer rollers 9 applied with a transfer bias, the four color toner images are primarily transferred and superimposed onto the intermediate transfer belt 4 which is being moved by the drive roller 11, to form a full color toner image. A paper P is then carried to a secondary transfer area between the intermediate transfer belt 4 and secondary transfer roller 14 at the timing at which the full color toner image is formed, and the full color toner image is secondarily transferred onto the paper P. After the transfer of the toner image, the remaining toner on the photoreceptor drums 6 is removed and recovered by the cleaning elements 10.

The paper P is then carried to the fuser unit 5 by a carrier belt 15 and applied with heat and pressure in a fuse nip between the fuse roller 5a including a not-shown heating element and the pressure roller 5b. Thereby, the full color toner image is fused on the paper P. The paper P is then discharged to a not-shown paper tray via a discharge roller. Note that the image forming device 1 selectively forms a monochrome toner image on a paper by driving only the imaging unit 2d, for example.

Figure 2:
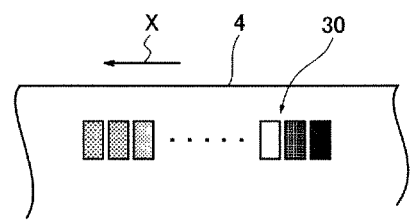
FIG. 2 shows toner patches on the surface of an intermediate transfer belt.

To obtain high-quality color images, it is essential to properly set the toner density of four color images. For this purpose, according to the image forming device 1 the toner patches 30 are formed with a certain interval on the intermediate transfer belt 4 and the reflective optical sensor 20 detects the densities or toner amounts of the toner patches. The toner patches are of a tone pattern showing a gradual increase in the density along the moving direction of the intermediate transfer belt 4 as shown in FIG. 2.

This reflective optical sensor 20 can be used for detecting a displacement of the toner a superimposed on the intermediate transfer belt 4 instead of detecting the densities of the toner patches.

Figure 3:
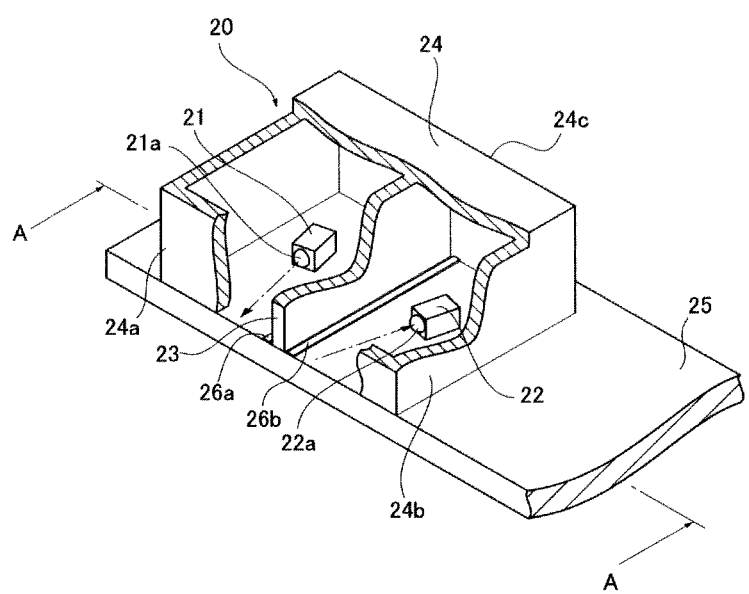
FIG. 3 is a perspective view of a reflective optical sensor with a part of a cover element broken according to the first embodiment.
Figure 4:
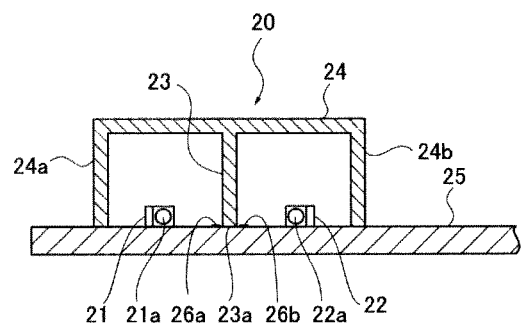
FIG. 4 is a cross section view of the reflective optical sensor along the A to A line in FIG. 3.

Now, the structure of the reflective optical sensor 20 is described. FIG. 3 is a perspective view of the reflective optical sensor 20 with a part of a cover element broken. FIG. 4 is a cross section view of the reflective optical sensor 20 along the A to A line in FIG. 3.

As shown in the drawings, the reflective optical sensor 20 comprises a light emitting element 21 as a LED to irradiate the toner patches 30 with a light beam, a light receiving element 22 as a photodiode to receive the light beam reflected by the toner patches 30, and a cover element 24 to cover the surrounding of the light emitting and receiving elements 21, 22. The cover element 24 is integrally formed with a light shielding wall 23 to be a partition between the light emitting and receiving elements 21, 22.

Figure 5:
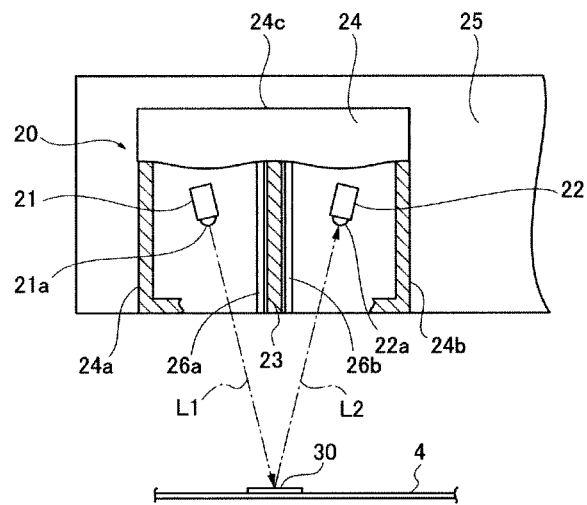
FIG. 5 is a plan view of the reflective optical sensor according to the first embodiment, with a part of a cover element broken.

The light emitting and receiving elements 21, 22 are mounted in parallel on a printed circuit board 25 at a certain angle as shown in FIG. 5 so that a light beam L1 from a light emitting portion 21a of the light emitting element 21 is reflected by the toner patches 30 on the intermediate transfer belt and a reflected light beam L2 is incident on a light receiving portion 22a of the light receiving element 22.

An exit path and an incident path (not shown) of the light beam L1 and reflected light beam L2 are formed on the front side (bottom side in FIG. 5) of the circuit board 25. Not-shown protrusions are provided on the bottom surfaces of the side walls 24a, 24b and rear wall 24c of the cover element 24. By fitting the protrusions into holes (not-shown) on the surface of the printed circuit board 25, the cover element 24 is securely fixed at the right position on the printed circuit board 25.

The light shielding wall 23 of the cover element 24 is to partition between the light emitting element 21 and light receiving element 22. It prevents a part of the light beam L1 reflected by the printed circuit board 25 from entering the light receiving portion 22a of the light receiving element 22. The light shielding wall 23 (FIG. 4) stands on the surface of the printed circuit board 25. Although not shown, a wiring pattern is formed on the printed circuit board 25 and electrically connected with the light emitting and receiving elements 21, 22.

Also, silkscreen layers 26a, 26b in a certain thickness and width are formed by silkscreen printing on the printed circuit board 25 along the side surfaces of the light shielding wall 23.

Figure 6:
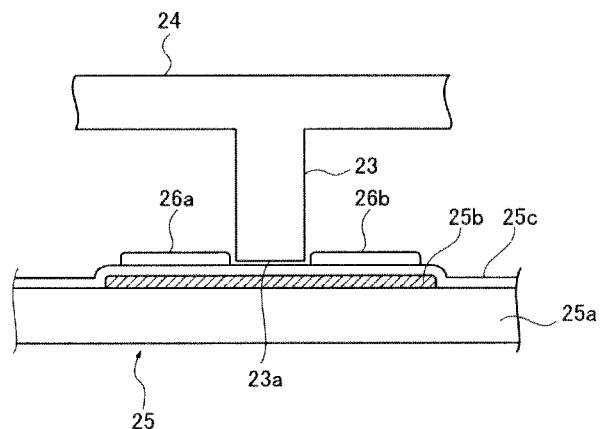
FIG. 6 is an enlarged cross section view of a printed circuit board near a light shielding wall of the reflective optical sensor according to the first embodiment.

In FIG. 6 the printed circuit board 25 is made of an insulated base 25a on which a wiring pattern of a copper foil layer 25b and a resist layer 25c are laid. The silkscreen layers 26a, 26b are formed on the resist layer 25c. A portion of the resist layer 25c covering the copper foil layer 25b is protruded by the thickness of the copper foil layer 25b. The resist layer 25c protects the surface of the printed circuit board 25 and it can be covered with a black coating to absorb light and improve light shielding effects.

Upon power-on of the image forming device 1 or discharge of a certain number of papers, the device performs a control to adjust the density of the four color toners properly. This control is referred to as process control herein.

In the process control the toner patches 30 are formed not to overlap with each other on the intermediate transfer belt 4 in the moving direction thereof. The continuous tone pattern of the toner patches is created by controlling the charge bias applied to the charge rollers 7, the develop bias applied to the develop sleeves (not shown) of the develop units 8, and the toner supply to the develop sleeves.

The light emitting portion 21a of the light emitting element 21 projects the light beam L1 to the toner patches 30 and the light receiving portion 22a of the light receiving element 22 receives a reflected light beam L2 therefrom and outputs an output signal or voltage to a not-shown controller in accordance with a received light amount. The controller performs a comparison operation of a detected density of the toner patch 30 and a preset reference density according to the output signal, and controls the charge bias to the charge rollers 7 and the develop bias and toner supply to the develop sleeves of the develop units 8 to properly adjust the toner density of an image to form.

According to the present embodiment the light shielding wall 23 is integrally formed in the cover element 24 between the light emitting and receiving elements 21, 22, to prevent a part of the light beam L1 reflected by the printed circuit board 25 from entering the light receiving portion 22a of the light receiving element when the toner density of the toner patch is detected. The bottom surface 23a of the light shielding wall 23 in FIG. 6 contacts the surface of the printed circuit board 25 to prevent a leakage of the light.

However, a gap may occur between the bottom surface 23a and the surface of the printed circuit board 25 due to a size tolerance of the cover element 24 when it was manufactured. Minute unevenness on the surface of the printed circuit board 25 may also cause a very small gap therebetween.

With such a gap, a part of the light beam L1 reflected by the printed circuit board 25 may leak to the light receiving element 22 through the gap and incidence of light onto the light receiving element 22 causes a variation in the output signal. This accordingly decreases the accuracy of detected densities.

As shown in FIGS. 3 to 6, the silkscreen layers 26a, 26b are formed on the circuit board 25 to prevent this from occurring. The thickness of the silkscreen layers 26a, 26b is set to be higher than at least the bottom surface 23a of the light shielding wall 23.

Further, the surfaces of the silkscreen layers 26a, 26b are covered with a black coating to absorb the light and enhance the light shielding effects.

Further, the surface of the silkscreen layer 26a close to the light emitting element 21 can be covered with a white coating, to reflect incident light to the upper side of the light shielding wall 23 and prevent the light from entering the gap between the bottom surface 23a of the light shielding wall 23 and the printed circuit board 25.

Thus, even with the occurrence of a gap between the bottom surface 23a of the light shielding wall 23 and the printed circuit board 25, the silkscreen layer 26a close to the light emitting element 21 can prevent light from entering the gap. Moreover, even if the light leaks to the light receiving element 22 through the gap, the silkscreen layer 26b near the light receiving element can prevent it from entering the light receiving portion 22a of the light receiving element 22.

Accordingly, only the reflected light beam L2 from the toner patches 30 is incident on the light receiving portion 22a so that the image forming device 1 can stably and accurately detect the density of the toner patches 30.

Compared with the related art in which a groove is formed on the circuit board, into which the light shielding wall is fitted, it is easier to form the silkscreen layers 26a, 26b on the printed circuit board 25 by known silkscreen printing. Thus, it is possible to reduce the produce time and costs for shielding the leakage of light.

Further, the silkscreen layer can be provided along either side (for example, close to the light emitting element 21) of the light shielding wall 23 instead of both sides. It can similarly obtain a high light shielding effect.

Second Embodiment

Figure 7:
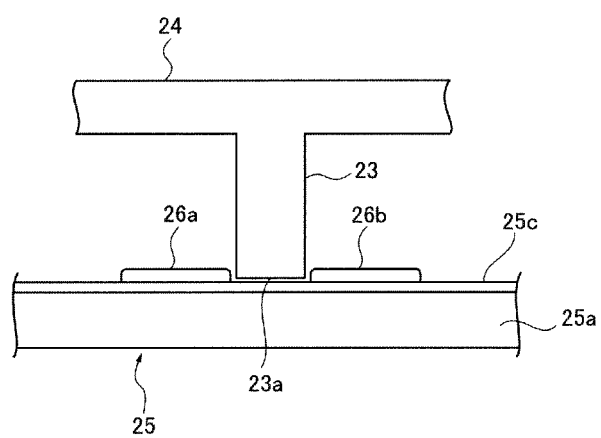
FIG. 7 is an enlarged cross section view of a printed circuit board near a light shielding wall of a reflective optical sensor according to a second embodiment of the present invention.

A reflective optical sensor according to a second embodiment is described with reference to FIG. 7. A difference from the one in the first embodiment is in that the surface of the printed circuit board is planar. The resist layer 25c is formed on the base 25a without the copper foil layer below the bottom surface 23a of the light shielding wall 23 and near both sides thereof.

As in the first embodiment, the silkscreen layers 26a, 26b are formed along both sides of the light shielding wall 23 on the printed circuit board 25.

The present embodiment can attain a high light shielding effect by the silkscreen layers 26a, 26b as the first embodiment.

Third Embodiment

Figure 8:
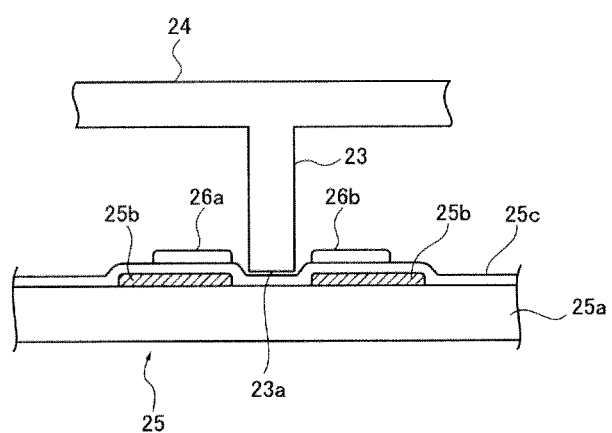
FIG. 8 is an enlarged cross section view of a printed circuit board near a light shielding wall of a reflective optical sensor according to a third embodiment of the present invention.

A reflective optical sensor according to a third embodiment is described referring to FIG. 8. A difference from the ones in the second and third embodiments is in that two copper foil layers 25b are formed near both sides of the bottom surface 23a of the light shielding wall 23 on the base 25a but not below the bottom surface 23a. The resist layer 25c is provided on the copper foil layers 25b and the base 25a.

Due to the two copper foil layers 25b, a portion of the resist layer 25c around below the bottom surface 23a is depressed, and the bottom surface 23a of the light shielding wall 23 is positioned in the depressed portion.

The silkscreen layers 26a, 26b are formed on the resist layer 25c above the copper foil layers 25b along both side surfaces of the light shielding wall 23 and near the bottom surface 23a.

Thus, in the present embodiment the light shielding wall 23 is disposed in the depression of the resist layer 25c and the silkscreen layers 26a, 26b are formed on the protruded portion of the resist layer 25c. This can further heighten the light shielding effects.

Further, it is easy to form the silkscreen layers 26a, 26b on the printed circuit board 25 by known silkscreen printing. Thus, it is possible to reduce the produce time and costs for preventing the leakage of light.

Further, known solder layers or copper foil layers, for example, can be formed along the side surfaces of the light shielding wall on the printed circuit board 25 in replace of the silkscreen layers.

Furthermore, the reflective optical sensor 20 can include a convergence lens in the exit and incidence paths for the light beam L1 and reflected light beam L2 on the front side of the printed circuit board. A part of the light beam L1 from the light emitting portion 21a may be reflected by this lens and a reflected light beam may leak from the gap between the bottom surface 23a of the light shielding wall 23 and the surface of the printed circuit board 25 to the light receiving element 23.

In this case the silkscreen layers 26a, 26b can also prevent such a reflected light beam from leaking to the light receiving element 22.

The reflective optical sensor according to any one of the above embodiments can be also applied for a sensor to detect the moving amount or position of a target object in addition to the density sensor of the image forming device.

The image forming device uses the reflective optical sensor according to any one of the above embodiments as a density sensor so that it can stably, precisely the density of toner patches.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A reflective optical sensor comprising:
   a light emitting element to irradiate a target object with a light beam;
   a light receiving element to receive the light beam reflected by a surface of the target object;
   a circuit board comprising a base, a wiring pattern disposed on the base, and a resist layer provided on a surface of the wiring pattern, on which the light emitting element and light receiving element are mounted, wherein the light emitting element is disposed on the circuit board to irradiate the light beam in a light emitting direction that is parallel to the circuit board;
   a cover element supported on the circuit board to surround the light emitting element and light receiving element;
   a light shielding wall provided in the cover element to be a partition between the light emitting element and light receiving element, and positioned to contact a surface of the circuit board at one end or not to contact the surface at one end with a minute gap, to prevent a part of the light beam from the light emitting element from leaking to the light receiving element, the one end being an end close to the circuit board; and
   a layer in a certain thickness formed on the surface of the circuit board along either or both sides of the light shielding wall.

2. A reflective optical sensor according to claim 1, wherein:
   the layer is a silkscreen layer formed by silkscreen printing;
   a surface of the silkscreen layer is located at a higher position than the one end of the light shielding wall close to the circuit board.

3. A reflective optical sensor according to claim 2, wherein the surface of the silkscreen layer is covered with a black coating.

4. A reflective optical sensor according to claim 2, wherein the surface of the silkscreen layer is covered with a white coating.

5. An image forming device comprising:
   an image carrier on which a toner patch is formed;
   the reflective optical sensor according to claim 1, to irradiate the toner patch with a light beam and receive the light beam reflected by the toner patch to detect a density of the toner patch, wherein
   the image forming device controls a density of a toner image in accordance with an output signal from the reflective optical sensor.

6. The reflective optical sensor according to claim 1, wherein the light receiving element is disposed on the circuit board to receive a reflected light beam that is parallel to the circuit board.

* * * * *